(12) United States Patent
Rober

(10) Patent No.: US 6,789,029 B2
(45) Date of Patent: Sep. 7, 2004

(54) METHOD AND APPARATUS FOR SIGNAL EXTRACTION IN AN ELECTRONIC SENSOR

(75) Inventor: Stephen J. Rober, Arlington Heights, IL (US)

(73) Assignee: Motorola, Inc., Schaumburg, IL (US)

( * ) Notice: Subject to any disclaimer, the term of this patent is extended or adjusted under 35 U.S.C. 154(b) by 152 days.

(21) Appl. No.: 10/273,805

(22) Filed: Oct. 18, 2002

(65) Prior Publication Data

US 2004/0078159 A1 Apr. 22, 2004

(51) Int. Cl.$^7$ .............................................. G06F 19/00
(52) U.S. Cl. ........................ 702/76; 702/77; 73/503.3
(58) Field of Search .................... 702/76, 77; 73/503.3, 73/504.02, 504.04, 504.12

(56) References Cited

U.S. PATENT DOCUMENTS

| | | |
|---|---|---|
| 5,387,253 A | 2/1995 | Remboski, Jr. et al. |
| 5,400,644 A | 3/1995 | Remboski, Jr. et al. |
| 5,481,914 A | 1/1996 | Ward |
| 5,515,720 A | 5/1996 | Remboski, Jr. et al. |
| 5,576,976 A | 11/1996 | White |
| 5,600,064 A | 2/1997 | Ward |
| 5,604,309 A | 2/1997 | Ward |
| 5,608,351 A | 3/1997 | Ward |
| 5,672,949 A | 9/1997 | Ward |
| 5,703,292 A | 12/1997 | Ward |
| 5,841,025 A | 11/1998 | Remboski et al. |
| 6,311,555 B1 | 11/2001 | McCall et al. |
| 6,386,032 B1 * | 5/2002 | Lemkin et al. .......... 73/504.02 |
| 6,456,939 B1 | 9/2002 | McCall et al. |
| 6,494,093 B2 * | 12/2002 | McCall et al. ................. 73/497 |
| 6,508,122 B1 * | 1/2003 | McCall et al. ........... 73/504.12 |
| 6,651,027 B2 * | 11/2003 | McCall et al. ............... 702/141 |

* cited by examiner

Primary Examiner—Patrick J Assouad
(74) Attorney, Agent, or Firm—Thomas V. Miller

(57) ABSTRACT

A method for extracting components from signals in an electronic sensor (50) having a sensing element (52). The sensing element (52) generates a first signal (60) and a second signal (62). The method comprises the steps of: receiving the first signal (60) from the sensing element (52), the first signal (60) having a frequency at an event; sampling the second signal (62) from the sensing element (52) based on the frequency of the event, the second signal (62) having a plurality of components, one of the plurality of components being a first component of interest (112, 114); generating a synchronized second signal (100) in a time domain, the second signal (62) having the plurality of components; generating complex data (110) in a frequency domain from the synchronized second signal (100) in the time domain; and determining the first component of interest (112, 114) from the complex data (110). There is also a system in an electronic sensor (50) according to the above-described methods.

23 Claims, 8 Drawing Sheets

METHOD AND APPARATUS FOR SIGNAL EXTRACTION IN AN ELECTRONIC SENSOR

FIELD OF THE INVENTION

This invention in general relates to the extraction of signals in an electronic sensor and, more particularly, to a method and apparatus that uses a frequency based technique for the extraction of signals in electronic sensors such as gyroscopes.

BACKGROUND OF THE INVENTION

Electronic sensors manufactured by MEMS technology are playing key roles in many areas. For instance, micro mechanical gyroscopes have enabled several important control systems in transportation and commercial applications. Other microdevices such as pressure sensors, accelerometers, actuators, and resonators fabricated by MEMS technology are also used in many areas.

In the area of micro gyroscopes, there is a need to provide improve techniques to extract components of interest from signals such as a signal component that is indicative of an angular rate that was externally induced to the gyroscope. One type of micro gyroscope contains two movable proof masses. The proof masses are vibrated in the same plane (in-plane) at a predetermined frequency by a motor in the gyroscope. The motor may include electrodes that drive the proof masses in the same plane in an oscillatory manner. The oscillation of the proof masses is controlled to a frequency near the resonant frequency of the proof masses.

In addition to a set of proof masses and drive electrodes, the gyroscope also contains sensing electrodes around the proof masses that report signals indicative of the movement of each proof mass. In particular, certain electrodes sense the in-plane movement of the proof masses. Other electrodes sense the out-of-plane movement of the proof masses. With appropriate signal processing and extraction circuitry, an angular rate component can be recovered from the reported signal of the electrodes sensing the out-of-plane movement of the proof masses.

A variety of techniques have been applied to extract a signal of interest in a gyroscope. These techniques, however, are limited in accuracy, reliability, and cost. In particular, the angular rate component of a signal from the out-of-plane electrodes must be isolated and extracted from several extraneous components such as the motor drive feedthrough, the quadrature component, the resonance of the motor drive feedthrough, and other system resonance and noise. Some of these extraneous components can be greater than the angular rate component. Moreover, the angular rate component of the signal varies considerably in magnitude and frequency over a full operating range of the gyroscope. There is also a variation from device to device that affects the relationship of the angular rate component to other components in the signal.

Current schemes to isolate and extract a signal from the gyroscope use a dual windowing scheme to extract the angular rate externally induced to the device. For instance, one technique known for extracting a reported angular rate signal 22 from a gyroscope element 20 is shown in FIG. 1. In this technique, two signals 24, 26 are generated from the gyroscope element 20. The first signal 24 is reported from electrodes that are in the same plane as the proof masses (in-plane electrodes). The first signal 24 is indicative of the oscillation of the gyroscope moving in an in-plane motion. One use of the first signal 24 is for motor drive control circuitry 28 to provide a control loop that maintains the oscillation of the proof masses to a frequency near the resonant frequency of the proof masses. The second signal 26 is reported from the electrodes that are not in the same plane as the proof masses (out-of-plane electrodes). The second signal 26 contains a signal component that is representative of the angular rate that is being externally induced on the gyroscope element 26. The second signal 26, however, also contains other extraneous signal components.

In this case, the signal processing circuitry includes a bandpass filter 30 that receives the second signal 26 and allows certain signal components that fall within a selected range of frequencies to pass through the filter. The output of the bandpass filter 30 is a complex filtered second signal 32, in the time domain, that contains an angular rate component and a quadrature component. The angular rate component of the complex filtered second signal 32 is one of the signal components of interest of the gyroscope. The quadrature component of the complex filtered second signal 32 is an error caused by the drive force of the gyroscope when it oscillates out-of-plane in an elliptical manner. The angular rate component and the quadrature component are offset by ninety degrees.

The system here uses a dual windowing scheme that includes the generation of two windows. The two windows are generated by a phase locked loop 34. The windows are set at ninety-degrees out of phase from each other in order to capture the two signal components. In particular, the quadrature component can be extracted by inputting the complex filtered second signal 32 to a first multiplier 36. The first multiplier 36 demodulates the complex filtered second signal 32 by multiplying the complex filtered signal 32 by a reference signal 38 that is a function of the first signal 24. The reference signal 38 is essentially a reference sinusoid that includes the in-plane signal amplitude and the resonant frequency of the proof masses. The reference signal 38 is generated from the phase locked loop 34. The output of the first multiplier 36 provides a calculated quadrature signal 40 that can be sent to the motor drive control circuitry 28.

The angular rate component can be extracted by inputting the complex filtered second signal 32 to a second multiplier 42. The second multiplier 42 demodulates the complex filtered second signal 32 by multiplying the filtered signal 32 by a phase shifted signal 44 that is ninety-degrees from the reference signal 38. The phase-shifted signal 44 is derived by coupling the reference signal 38 to a ninety-degree phase shifter 46. The output of the second multiplier 42 provides the reported angular rate signal 22 indicative of the rotational rate externally induced to the gyroscope element 20. A low pass filter 48 may be used to remove any further signal components with a high frequency.

This type of system, however, has limitations. For example, the system requires a very precise narrow bandpass filter. The use of a narrow bandpass filter passes only the signal components within an expected range of frequencies. Using a narrow bandpass filter requires that the windows be delayed to match the delay of the signal induced by the filter. If a band rejection filter is be used, then the quadrature and the rate signals may contain elements of the noise and the final values are susceptible to DC offsets of the signal. Moreover, the system does not account for variations from device to device that may affect the relationship of the angular rate.

A need exists for an improved system for extracting the angular rate component from the output signal of a gyroscope sensor. It is, therefore, desirable to provide an improved procedure and apparatus for extracting signals to overcome most, if not all, of the preceding problems.

Figure 1:
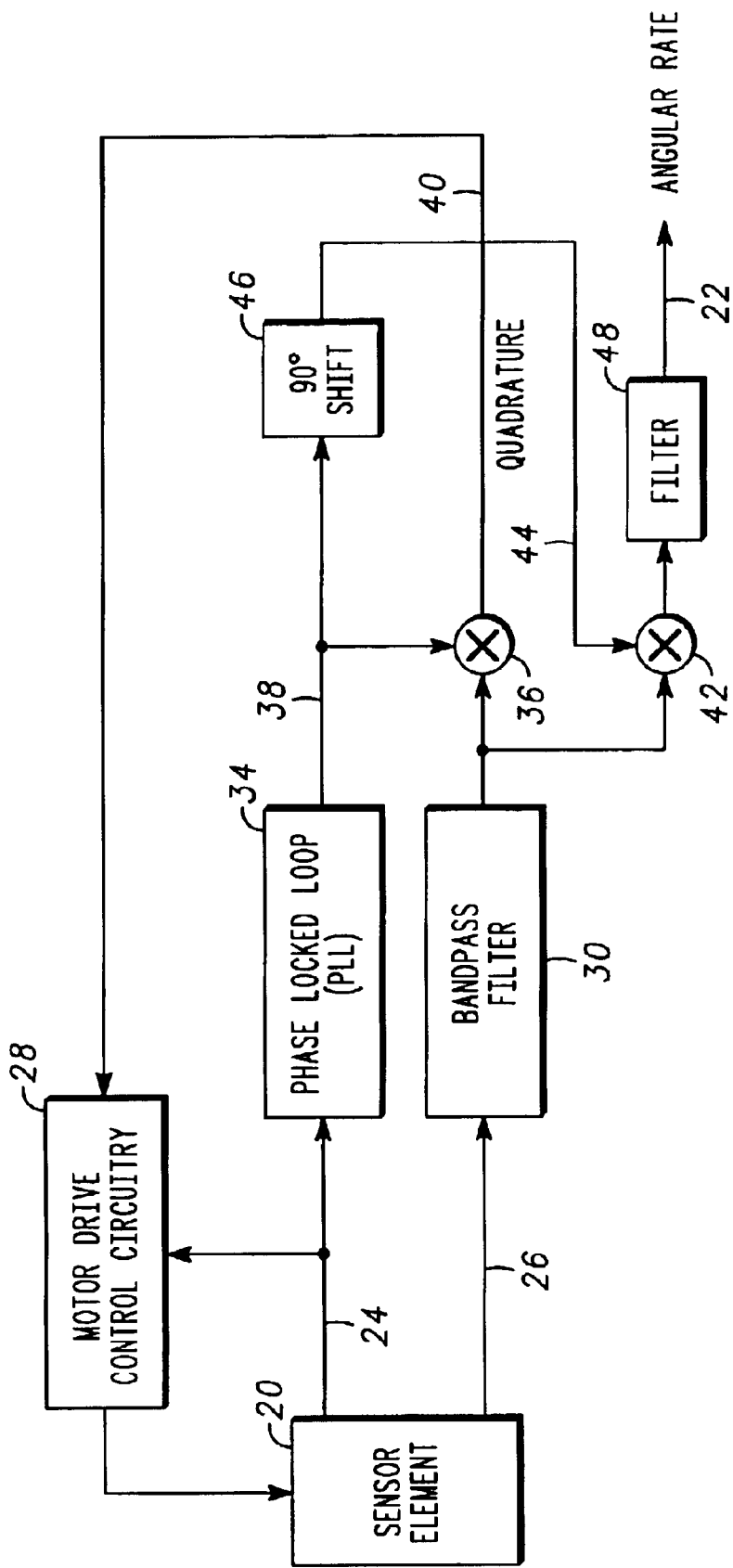
FIG. 1 is a block diagram of a system for extracting an angular rate from a sensing element according to the prior art.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the appended claims.

DETAILED DESCRIPTION

What is described is an improved procedure and device for extracting signals in an electronic sensor such as a gyroscope. To this end, in one embodiment there is a method for extracting components from signals in an electronic sensor having a sensing element. The sensing element generates a first signal and a second signal. The method comprises the steps of: receiving the first signal from the sensing element, the first signal having a frequency at an event; sampling the second signal from the sensing element based on the frequency of the event, the second signal having a plurality of components, one of the plurality of components being a first component of interest; generating a synchronized second signal in a time domain, the second signal having the plurality of components; generating complex data in a frequency domain from the synchronized second signal in the time domain; and determining the first component of interest from the complex data.

The plurality of components may further include a second component of interest. The method would then further comprise the step of determining the second component of interest from the complex data. The step of receiving the first signal from the sensing element may include receiving the first signal in a phase locked loop. The step of sampling the second signal from the sensing element may include sampling the second signal by an analog-to-digital converter. The sampling may further be done so that the sampling of the second signal is at a multiple of the frequency of the event. The step of generating complex data in the frequency domain may be done through the use of a Fourier Transform. The method may further include a step of determining a reported component of interest from the first component of interest wherein the reported component of interest is determined based on a predetermined offset of the first component of interest.

In another embodiment, there is a method for extracting an angular rate in a gyroscope sensor having a sensing element with a pair of proof masses. The method comprises the steps of: receiving a first signal from the sensing element, the first signal representative of a first movement of the proof masses in a first plane; receiving a second signal from the sensing element, the second signal representative of a second movement of the proof masses in a second plane; sampling the second signal from the sensing element based on the frequency of the first signal; generating a synchronized second signal in a time domain, the synchronized second signal including a plurality of components, one of the plurality of components being the angular rate; generating complex data in a frequency domain from the synchronized second signal in the time domain, the complex data including a plurality of components; and determining the angular rate from the complex data.

There is also a system in an electronic sensor for extracting components of interest from signals. The system comprising a sensor element; a phase locked loop, a signal sampler, a spectrum analyzer, and a decoder. The sensor element reports a first signal and a second signal. The first signal has a frequency at an event. The phase locked loop receives the first signal and determines the frequency of the event. The signal sampler receives the second signal and generates a synchronized second signal in a time domain. The signal sampler is also capable of sampling the second signal based on the frequency of the event determined by the phase locked loop. The spectrum analyzer receives the synchronized second signal in the time domain and generates complex data in a frequency domain. The decoder receives the complex data in the frequency domain and generates a first component of interest from the complex data.

In one embodiment, the system is for a gyroscope where the sensor element has at least a pair of movable proof masses, the first signal and the second signal are indicative of the oscillatory movement of the proof masses, and the first component of interest is an angular rate of the sensing element. The decoder may further generate a second component of interest such as a quadrature of the proof masses. The signal sampler may be an analog-to-digital converter. The signal sampler may further sample the second signal based on a multiple of the frequency of the event determined by the phase locked loop. The spectrum analyzer may generate the complex data using a Fourier Transform. The scaling unit may be configured to generate a reported component of interest from a calculated component of interest based on a predetermined offset.

Figure 2:
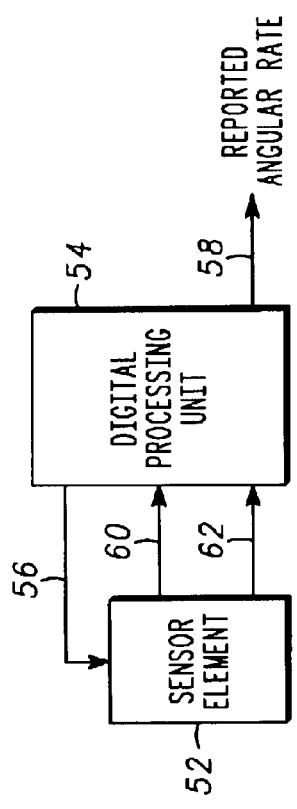
FIG. 2 is a high-level block diagram of one embodiment of an electronic sensor of the present invention.

Now, turning to the drawings, FIG. 2 illustrates one embodiment of an electronic sensor 50 having a sensor element 52 and digital processing unit 54. To illustrate the present invention, a micro gyroscope sensor will be used as an exemplary embodiment of the electronic sensor 50. As one of ordinary skill in the art with the benefit of this disclosure will realize, however, the methods and devices of the present invention could be used in other types of electronic sensors and devices.

In one embodiment, the digital processing unit 54 may be implemented in a digital signal processor (DSP) controller that includes a number of functional blocks as described in more detail below. Generally, in one embodiment, the digital processing unit 54 may control the movement of proof masses of the sensor element 52 in one plane by sending a motor drive signal 56 to the sensor element 52. Alternatively, a separate analog system could be used to control the movement of the proof masses of the sensor element 52 as known to those of ordinary skill in the art. The digital processing unit 54 may also extract and report an angular rate 58 that is reflective of the angular rate that is externally induced to the sensor element 52. To extract and report the angular rate 58, the present invention uses the digital processing unit 54 to receive a first signal 60 and a second signal 62 from the sensor element 52. As will be described further below, the first signal 60 is reported from sensing electrodes that are in the same plane as the proof masses. The second signal 62 is reported from sensing electrodes that are not in the same plane as the proof masses.

Figure 3:
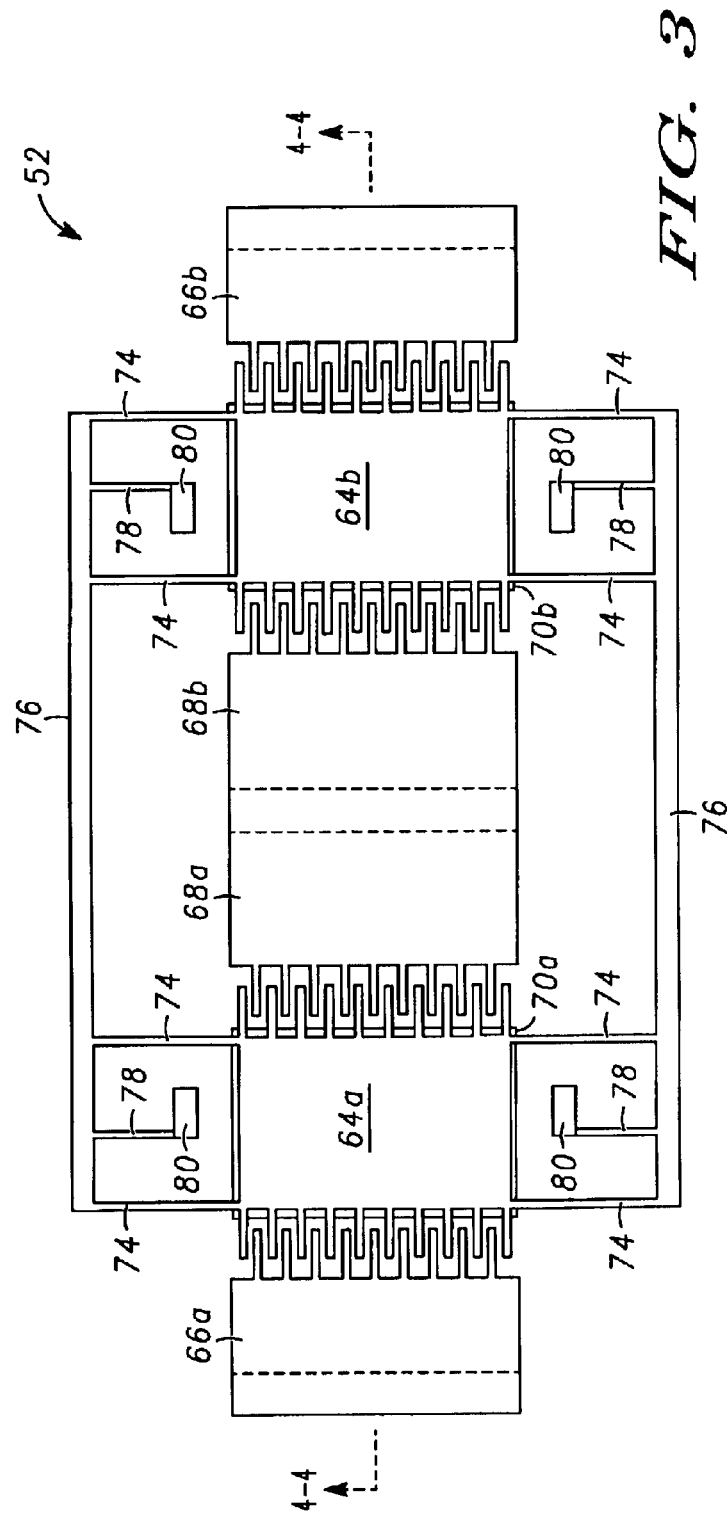
FIG. 3 is a top view of one embodiment of a sensor element of the present invention.
Figure 4:
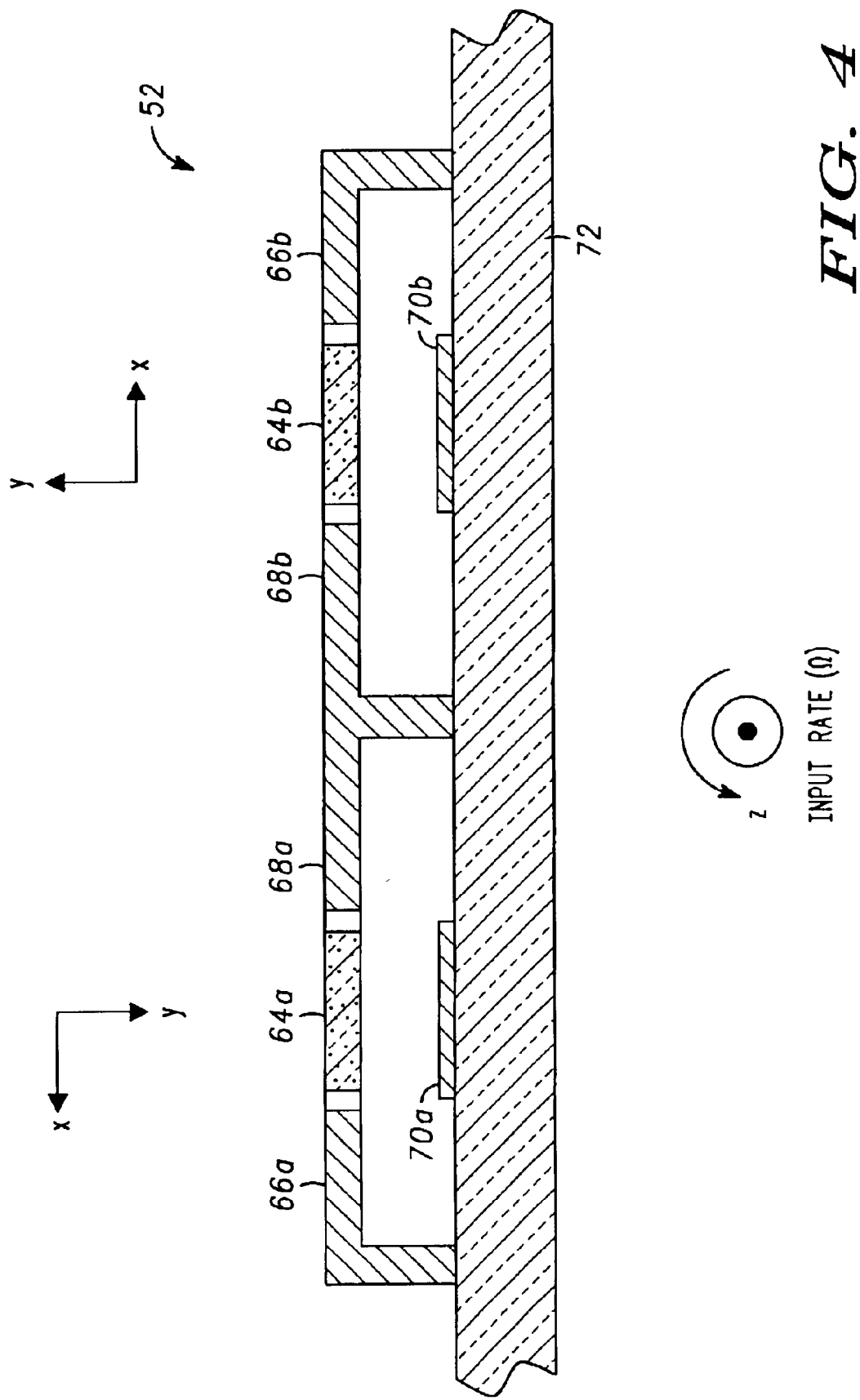
FIG. 4 is a cross-sectional view of the sensor element in FIG. 3 along lines 44.

Referring to FIGS. 3 and 4, the sensor element 52 generally includes a pair of movable proof masses 64a, 64b, a pair of outer combs 66a, 66b, a pair of inner combs 68a, 68b, and a pair of out-of-plane sensing electrodes 70a, 70a. FIG. 3 is a top view of the sensor element 52 and FIG. 4 is a cross sectional view of the sensor element 52. The components of the sensor element 52 are mounted to a substrate 72 and, preferably, housed within a vacuum-sealed cavity.

As illustrated in FIG. 3, the pair of proof masses 64a, 64b are attached to a series of drive beams 74, base beams 76, and torsion beams 78. The beams 74, 76, 78 permit the proof masses 64a, 64b to move in relation to a series of anchor points 80. The anchor points are rigidly attached to the substrate 72. The proof masses 64a, 64b are permitted to move in at least two planes. The first plane (in-plane) is defined by an x-axis as shown in FIG. 4. The second plane (out-of-plane) is defined by a y-axis.

The pair of outer combs 66a, 66b are electrodes that drive the proof masses 64a, 64b in the first plane defined by the x-axis. The pair of outer combs 66a, 66b may be mounted to the substrate 72. The outer combs 66a, 66b are driven by the motor drive signal 56 generated by the digital processing 54 or, alternatively, through a separate analog system. The drive signal 56 is generated in a closed loop manner to oscillate the proof masses 64a, 64b at a frequency near the resonance frequency of the proof masses 64a, 64b.

The pair of inner combs 68a, 68b are in the same plane as the proof masses 64a, 64b. The pair of inner combs 68a, 68b may be mounted to the substrate 72. The pair of inner combs 68a, 68b may be electrodes that sense the movement of the proof masses 64a, 64b in the x-axis. The pair of inner combs 68a, 68b are used to report the first signal 60 to the digital processing unit 54.

The pair of out-of-plane sensing electrodes 70a, 70b sense the out-of-plane movement of the proof masses 64a, 64b. The pair of out-of-plane sensing electrodes 70a, 70b may be positioned beneath the pair of proof masses 64a, 64b. The pair of out-of-plane sensing electrodes 70a, 70b are used to report the second signal 62 to the digital processing unit 54. As will be described in more detail below, the second signal 62 contains an angular rate component that reflects the angular rate externally induced to the sensor element 52. The second signal 62 is representative of the movement of the proof masses 64a, 64b in the y-axis caused by an externally induced rotational rate in the z-axis. This is shown in FIG. 4 as input rate (Ω). As will be explained in more detail below, the digital processing unit 54 receives the second signal 62 and extracts the angular rate component to report the angular rate 58.

Figure 5:
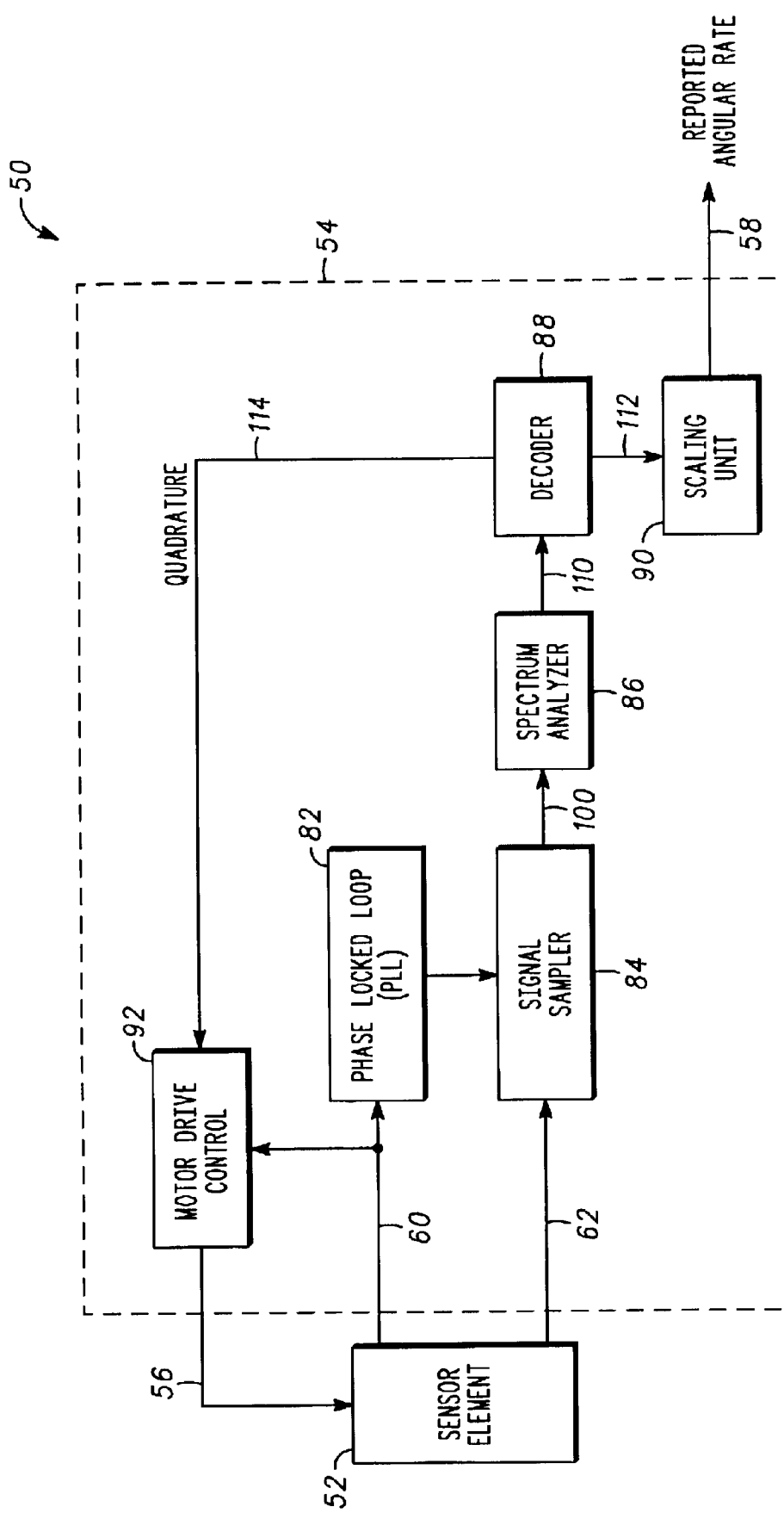
FIG. 5 is a block diagram of one embodiment of an electronic sensor of the present invention.

As mentioned above, the digital processing unit 54 may be implemented in a digital signal processor (DSP) controller containing several functional blocks. Referring to FIG. 5, in one embodiment, the digital processing unit 54 may generally include a phase locked loop 82, a signal sampler 84, spectrum analyzer 86, a decoder 88, and a scaling unit 90. The digital processing unit 54 may further include a motor drive control 92 for controlling the oscillation of the proof masses 64a, 64b in the x-axis. Alternatively, the motor drive 92 could be implemented using an analog system similar to that known in the prior art. These functional blocks may be microcoded signal processing steps that are programmed as operating instructions in the digital processing unit 54.

In one embodiment, the digital processing unit 54 receives the first signal 60 for input into the motor drive control 92 and the phase locked loop 82. The motor drive control unit uses the first signal 60 in a closed control loop to produce a motor drive signal 56 for the sensor element 52. The motor in the sensor element 52 should be driven at a frequency of f/2. Due to electromechanical interaction of the sensor element 52 with the excitation, the sensor element 52 will then oscillate at a frequency f. The goal of the motor drive control 92 is to maintain constant amplitude along the x-axis at the proof masses' 64a, 64b resonance frequency $f_{RES}$. In a design similar to that shown in FIGS. 3 and 4, in one embodiment, the resonance frequency $f_{RES}$ was bounded by: 15 kHz $\leq f_{RES} \leq$ 22 kHz.

To achieve excitation and operation at resonance frequency $f_{RES}$ of the proof masses 64a, 64b, a separate phase locked loop may be used in the motor drive control 92 to detect and match the resonance frequency of the element. The phase locked loop would be used to drive the frequency of the excitation at $f_{RES}/2$. A control loop in the motor drive control 92 is used to control the amplitude of the drive signal 56.

The digital processing unit 54 uses the second signal 62 to extract an angular rate component for the reported angular rate 58. As mentioned above, the motion of the proof masses 64a, 64b in the y-axis is reported to the digital processing unit through the second signal 62 by the out-of-plane sensing electrodes 70a, 70b. The motion in the y-axis includes at least two main components: (1) a quadrature component caused from the motor drive signal in the x-axis; and (2) an angular rate component caused by a rotational input around the z-axis causing motion in the y-axis via the Coriolis effect. The quadrature component from the x-axis motion is in-phase with the x-axis. The motion induced by the z-axis rotation is offset by ninety-degrees.

The second signal 62 will typically include other extraneous components such as the motor drive feedthrough and other resonance and noise sources. Examples of the reported motion from each of the two out-of-plane sensing electrodes are shown in the charts in FIGS. 6 and 7. These charts illustrate some of the data observed during a test where the sensor element 52 was subjected to an angular rate of between 100°/sec to 100°/sec in 25°/sec increments. For purposes of illustration and clarity, only three of the increments are shown in the charts in FIGS. 6 and 7. Each chart represents the motion reported by one of the out-of-plane sensing electrodes 70a, 70b in the y-axis.

Figure 7:
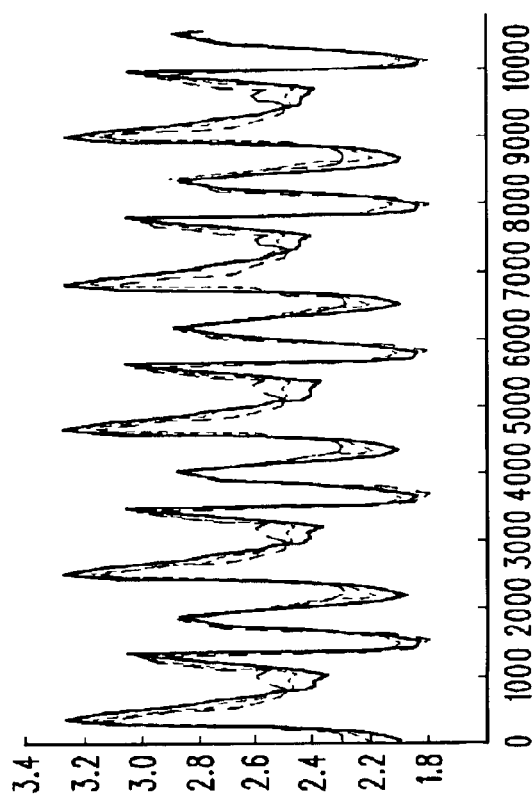
FIGS. 6 and 7 are charts of the outputs from sensing electrodes of the sensor element in FIG. 3 at different input angular rates in the time domain.
Figure 6:
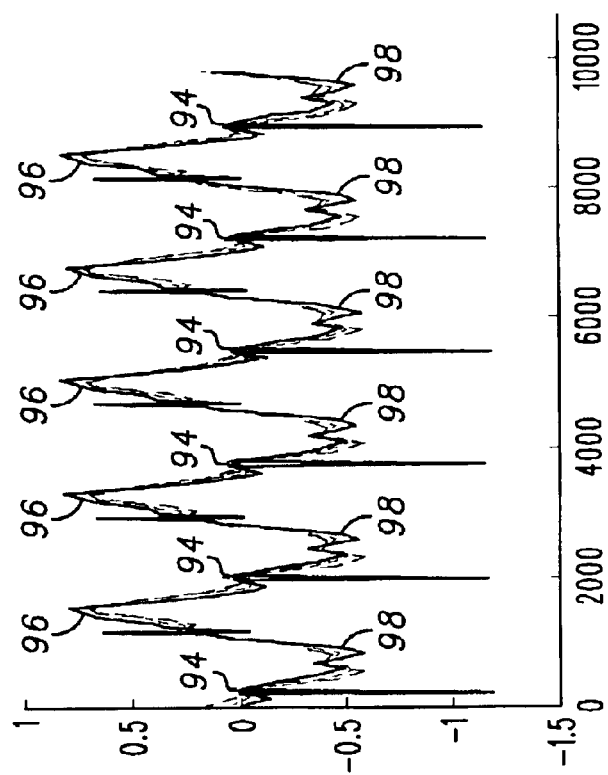

In FIG. 6, the main sinusoid that is observed is actually drive signal feedthrough at $f_{RES}/2$. The signals of interest are in the humps of the waveform. The humps are visible at points 94 (near the center of the signal) and at points 96, 98 (at the peaks and valleys of the signal). In FIG. 7, the drive signal feedthrough is very pronounced as a sharp change in the waveform. The signal not only has a large component at $f_{RES}/2$, but also at the harmonics at $3f_{RES}/2$, $5f_{RES}/2$, $7f_{RES}/2$, and so on.

In one embodiment, an angular rate component is extracted from the second signal 62 through the use of the phase locked loop 82, the signal sampler 84, the spectrum analyzer 86, the decoder 88, and the scaling unit 90.

In one embodiment, the signal sampler 84 takes samples of the second signal 62 and converts the second signal 62 to a format acceptable for further processing in the digital processing unit 54. For example, the signal sampler 84 samples the second signal 62 and converts it to a digital signal. In one embodiment, the signal sampler 84 includes components such as an amplifier and an analog-to-digital (A/D) converter. Although the signal sampler 84 in FIG. 5 is shown as part of the digital processing unit 54, the components could also be a separate unit that provides a direct input to other components of the digital processing unit 54.

In one aspect of the present invention, the phase locked loop 82 is used to adapt the sampling frequency of the signal sampler 84 to the sensor element 52. In other words, the output of the phase locked loop 82 is used to synchronize the second signal 62 for a particular resonance frequency of the proof masses 64a, 64b. If the signal sampler 84 includes an analog-to-digital converter, then the analog-to-digital converter measures and samples the voltage signal based on an input from from the phase locked loop 82. In a preferred embodiment, the second signal 62 is oversampled based on the resonance frequency of the proof masses 64a, 64b. For example, the signal sampler 84 can be set to oversample at a multiple of the resonance frequency such as $8*f_{RES}$. This enables the collection of 128 samples. If the resonance frequency range of the sensor element is $15\,\text{kHz} \leq f_{RES} \leq 22\,\text{kHz}$, this results in a sample range of between 0.727 to 1.066 ms. The main calculation, control, and reporting loop would then be at 2.0 ms. The signal sampler 84 could be set to other oversample rates such as $4*f_{RES}$ or $16*f_{RES}$.

The output of the signal sampler 84 is a digital synchronized second signal 100 and will be a function of time. The synchronized second signal 100 generated by the signal sampler 84 will include a composite of signals including a quadrature component and an angular rate component. Other components of the sampled signal may include motor drive feedthrough and other system resonance and noise.

In the preferred embodiment of the present invention, the synchronized second signal 100 (in the time domain) is converted to a frequency domain through the use of the spectrum analyzer 86. In one embodiment, the spectrum analyzer 86 uses DSP based techniques to implement a Fast Fourier Transform (FFT) and, in particular, a Discrete Fourier Transform (DFT). The DFT is a suitable technique for the spectrum analyzer because it applies a mathematical technique for resolving time domain functions into a frequency spectrum.

Figure 8:
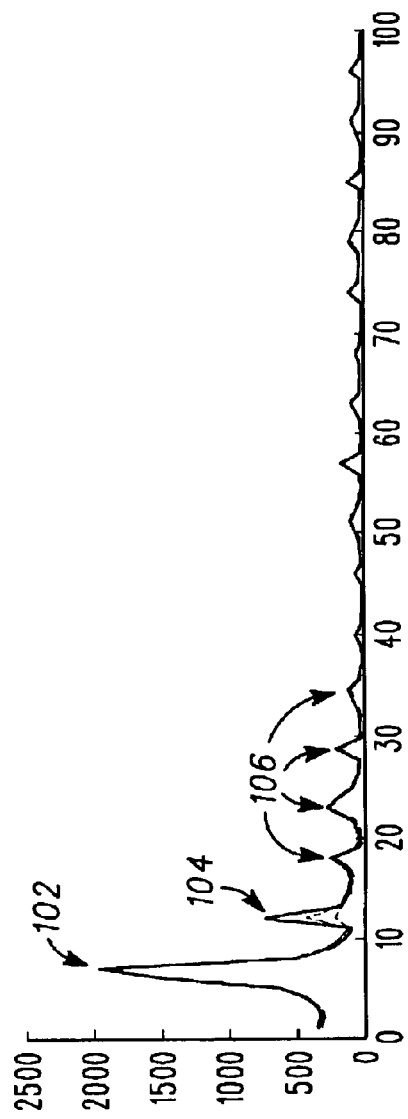
FIGS. 8 and 9 are charts of the outputs in FIG. 7 in the frequency domain.
Figure 9:
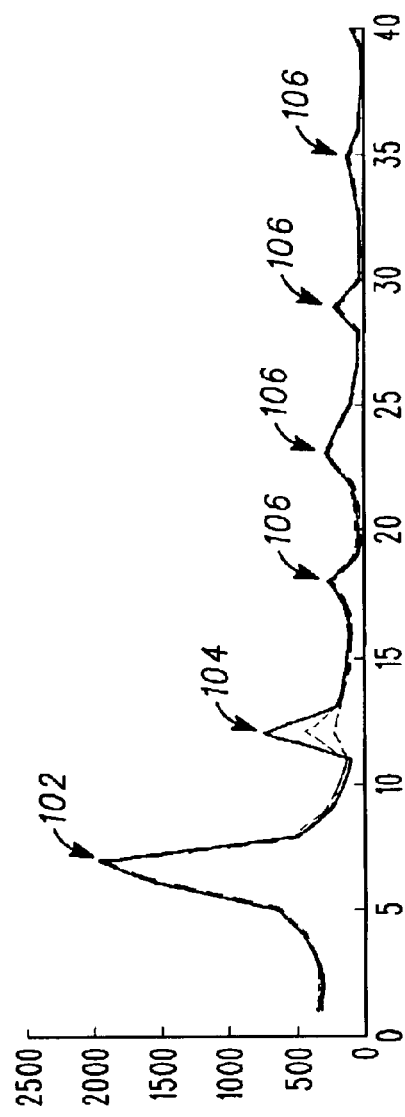

Generally, a spectrum analyzer can decompose or separate a waveform or function into sinusoids of different frequency that sum to the original waveform. In other words, it identifies or distinguishes the different frequency sinusoids and their respective amplitudes. In this case, for example, applying the second signal 62 shown in FIG. 7 through the spectrum analyzer of this invention will result in spectra similar to that shown in FIGS. 8 and 9. In this case, the first set of peaks 102 is representative of the motor drive through component of the second signal 62. The second set of peaks 104 is representative of two combined components—the quadrature component and the angular rate component—of the second signal 62. It is important to note that the amplitude of the second set of peaks 104 vary according to the magnitude of the angular rate that was externally applied to the sensing element 52. This is best shown in FIG. 9 where differences exist in the height of the peaks between the three plots taken for different angular rates. The third, fourth, fifth, and sixth set of peaks 106 are representative of the resonance of the motor drive feedthrough of the second signal 62. The remaining peaks are further resonance and noise components of the second signal 62 in the system.

Generally performing a Fourier transform over an entire frequency spectrum of interest in this case, however, would require a lot of computation time to search for a particular frequency of interest. For example, as mentioned above, the general range of interest found in one embodiment of the sensor element 52 was a range of $15\,\text{kHz} \leq f_{RES} \leq 22\,\text{kHz}$, the range of the resonant frequency of the proof masses.

Thus, in the preferred embodiment, as mentioned above, the present invention uses the phase locked loop 82 for the first signal 60 to adapt the sampling frequency of the signal sampler 84. This enables the system to advantageously use an event-based sampling method instead of a time-based sampling method. In other words, the use of the phase locked loop 82 as part of the sampling clock of the signal sampler 84 allows the present system to reject the off-frequency components and separate the two combined components (quadrature and angular rate) occurring at the same frequency. Sampling the second signal 62 in this way provide several advantages. First, the signals of interest will always be at the same point in the event-based frequency spectrum. This eliminates additional computation time in searching for the frequency of interest due to slight variations between sensor elements. Second, by sampling the signal at specific events of the waveform, the quadrature component and the angular rate components of the second signal can be separated out and measured individually.

The spectrum analyzer 86 is used to determine the amplitude and the phase of the synchronized second signal 100. If using a Discrete Fourier Transform, the general transform is in the following form of equation (1).

$$X(k) = \sum_{n=1}^{N} x(n)\exp\left[-j2\pi\frac{(k-1)(n-1)}{N}\right] \text{ for } 1 \leq k \geq N \quad (1)$$

In the present invention, however, using the event-based sampling method mentioned above, X(k) only needs to be calculated at a single point instead of N points. The result of the DFT would then be a complex number in the form of equation (2).

$$X = X_{REAL} + jX_{COMPLEX} \quad (2)$$

Accordingly, in one embodiment, the output of the spectrum analyzer 86 is complex data 110 as shown in FIG. 5. The complex data 110 is a summation of the two components at the selected frequency: the angular rate component and the quadrature component. The output of the spectrum analyzer 86 may then be inputted into the decoder 88.

The decoder 88 determines a calculated angular rate component 112 and a calculated quadrature rate component 114 from the complex data 110 received from the spectrum analyzer 86. As mentioned above, in one embodiment of the present invention, the complex data 110 is a summation of the two components at the event-based frequency. The two signal components are offset physically by ninety-degrees from each other and, using the system and method described above, the components of the complex data 110 will also be ninety-degrees from each other.

Figure 10:
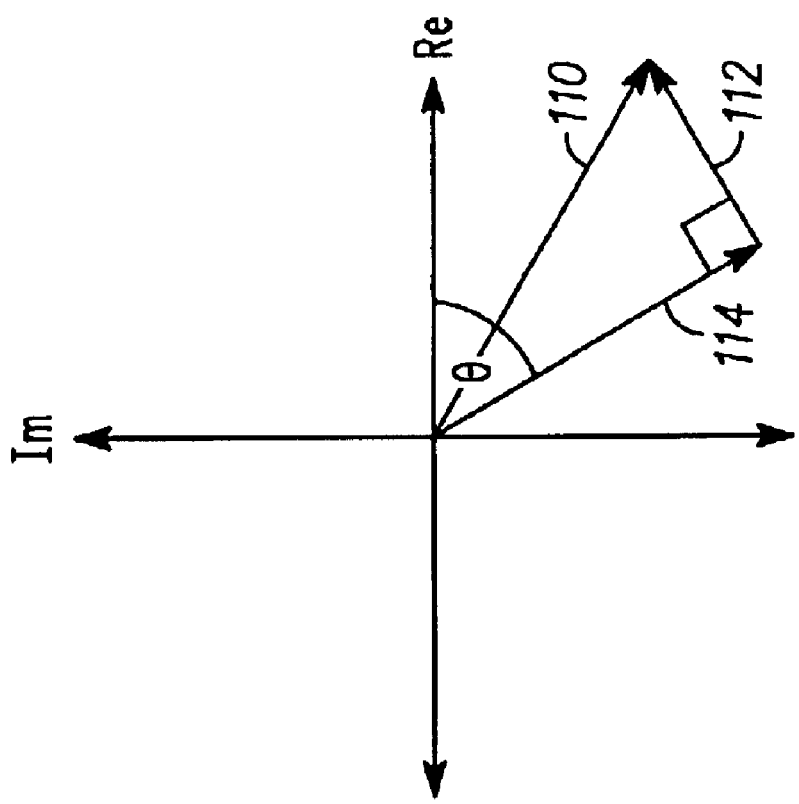
FIG. 10 is a diagram of a signal from the sensor element and its components in the frequency domain.

In other words, the decoder 88 can break down the complex data 110 into its angular rate component and its quadrature component. This is illustrated further in relation to the diagram in FIG. 10. The angle (Θ) is constant due to the event-based sampling method described above. To obtain a calculated angular rate component 112 and the quadrature component 114 from the complex data 110, an angular project/rotation is used having a formula like the one in equation (3).

$$\begin{bmatrix} QUADRATURE \\ ANGULAR\ RATE \end{bmatrix} = \begin{bmatrix} \cos\Theta & \sin\Theta \\ -\sin\Theta & \cos\Theta \end{bmatrix} \begin{bmatrix} X_{REAL} \\ X_{COMPLEX} \end{bmatrix} \quad (3)$$

The decoder 88 has outputs to generate two components of interest: a calculated angular rate component 112 and a calculated quadrature component 114. The calculated angular rate component 112 may be reported externally from the digital processing unit 54. Alternatively, as described further below, the calculated angular rate component 112 can be sent to a scaling unit 90 for further processing. The calculated quadrature component 114 may be sent to the motor drive control 92 to assist in generating the drive signal 56.

It has been found that for systems with a relatively fixed quadrature value and varying angular rate, the calculated angular rate component 112 from the decoder 88 for a single frequency over different angular rates generally end up in the form of a line. This is illustrated in FIG. 1I that shows data obtained from one of the out-of-plane sensing electrodes 70a, 70b during an experiment. It may be important to note that in some applications a variation may occurs that results in points that do not form a straight line. This may result from the fact that the quadrature component may actually vary between tests.

Accordingly, in one embodiment of the present invention, the digital processing unit 54 further includes the scaling unit 90 to convert the calculated angular rate component 112 to a reported angular rate 58. The reported angular rate 58 can then be outputted from the digital processing unit 54.

Figure 12:
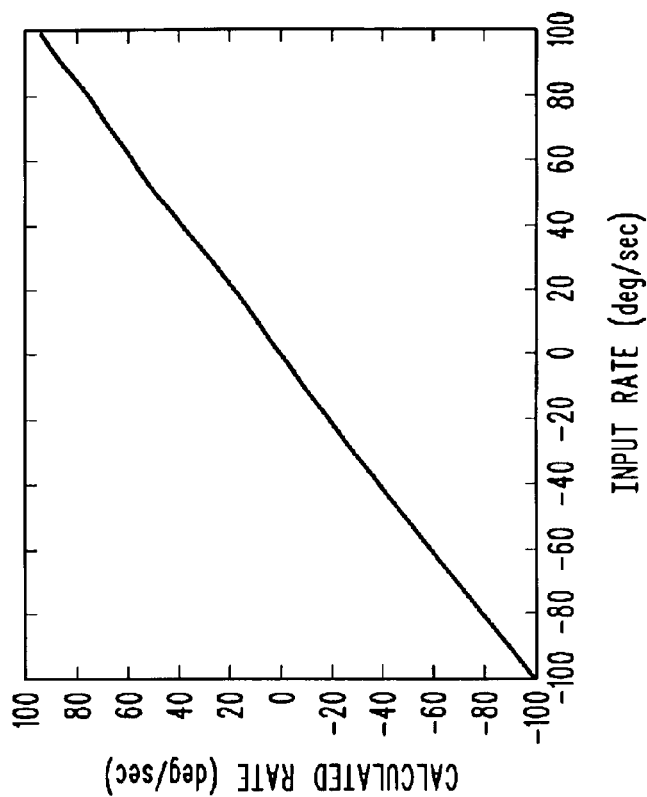
FIG. 12 is another graph of experimental data plotting a calculated angular rate versus an input angular rate.
Figure 11:
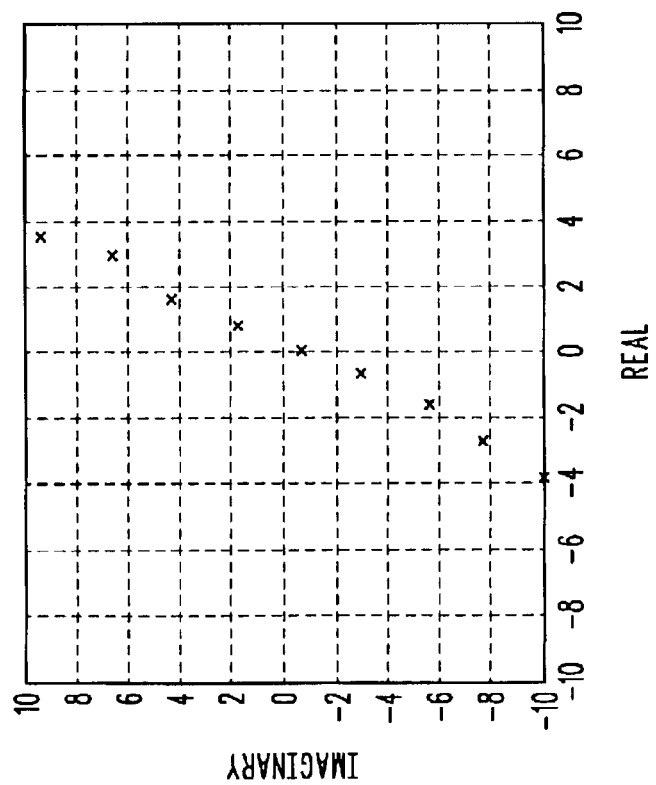
FIG. 11 is a graph of experimental data obtained from the sensor element.

The scaling unit 90 may be implemented in a number of ways. FIG. 12 illustrates one example of a graph that can be used in converting the calculated angular rate signal 112 to a reported angular rate 58. The graph shows calculated angular rate versus input angular rate. The graph in FIG. 12 was obtained through experiential data from a sensor element similar to the one shown in FIGS. 3 and 4. A similar graph could be prepared for different sensors. This data may be used to determine an offset to the calculated angular rate signal 112. An offset may be needed in some applications where a measurement error is present due to a particular sampling method or due to other the manufacturing errors in the sensor element 52. If an offset is used, a suitable formula for applying the offset is in equation (4).

$$\begin{bmatrix} QUADRATURE \\ ANGULAR\ RATE \end{bmatrix} = \begin{bmatrix} \cos\Theta & \sin\Theta \\ -\sin\Theta & \cos\Theta \end{bmatrix} \begin{bmatrix} X_{REAL} \\ X_{COMPLEX} \end{bmatrix} + \begin{bmatrix} cal\_offset\_1 \\ cal\_offset\_2 \end{bmatrix} \quad (4)$$

What has been described is an improved method and system for extracting the angular rate component from the output signal of an electronic sensor. The method and system eliminates the need for a narrow bandpass filter. It also requires less computation than a digital bandpass filter. It improves the accuracy, the speed, and the cost of the electronic sensor. The method and system reduces the effect of the noise spectrum and significantly reduces the effect of the motor drive feedthrough. The method and system makes advantageous use of a Discrete Fourier Transform with an additional use of a phase locked loop to adapt the sampling frequency to the specific electronic sensor. The coefficients for the Discrete Fourier Transform are known a priori based on the phase locked sampling method, the number of samples, and amount of oversampling per waveform. Moreover, the method and system provides an efficient and robust event-based sampling scheme instead of a time-based sampling scheme. Furthermore, the present invention incorporates a way to account for variances between sensor elements.

The above description of the present invention is intended to be exemplary only and is not intended to limit the scope of any patent issuing from this application. The present invention is intended to be limited only by the scope and spirit of the following claims.

What is claimed is:

1. A method for extracting components from signals in an electronic sensor having a sensing element, the sensing element generating a first signal and a second signal, the method comprising the steps of:

receiving the first signal from the sensing element, the first signal having a frequency at an event;

sampling the second signal from the sensing element based on the frequency of the event, the second signal having a plurality of components, one of the plurality of components being a first component of interest;

generating a synchronized second signal in a time domain, the second signal having the plurality of components;

generating complex data in a frequency domain from the synchronized second signal in the time domain; and determining the first component of interest from the complex data.

2. The method of claim 1, wherein the plurality of components further includes a second component of interest, the method further comprising the step of determining the second component of interest from the complex data.

3. The method of claim 1, wherein the step of receiving the first signal from the sensing element includes receiving the first signal in a phase locked loop.

4. The method of claim 1, wherein the step of sampling the second signal from the sensing element includes sampling the second signal by an analog-to-digital converter.

5. The method of claim 1, wherein the step of sampling the second signal from the sensing element includes sampling the second signal at a multiple of the frequency of the event.

6. The method of claim 1, wherein the step of generating complex data in the frequency domain from the synchronized second signal in the time domain includes generating complex data through the use of a Fourier Transform.

7. The method of claim 1, wherein the electronic sensor is a gyroscope, the sensing element having at least a pair of movable proof masses, the first signal and second signal being indicative of oscillatory movement of the proof masses, and the first component of interest being an angular rate of the sensing element.

8. The method of claim 1 further comprising the step of determining a reported component of interest from the first component of interest, the reported component of interest being determined based on a predetermined offset of the first component of interest.

9. A method for extracting an angular rate in a gyroscope sensor having a sensing element with a pair of proof masses, the method comprising the steps of:

receiving a first signal from the sensing element, the first signal representative of a first movement of the proof masses in a first plane;

receiving a second signal from the sensing element, the second signal representative of a second movement of the proof masses in a second plane;

sampling the second signal from the sensing element based on the frequency of the first signal;

generating a synchronized second signal in a time domain, the synchronized second signal including a plurality of components, one of the plurality of components being the angular rate;

generating complex data in a frequency domain from the synchronized second signal in the time domain, the complex data including the plurality of components; and determining the angular rate from the complex data.

10. The method of claim 9, wherein the plurality of components further includes a quadrature component, the method further comprising the step of determining the quadrature component from the complex data.

11. The method of claim 9, wherein the step of receiving the first signal from the sensing element includes receiving the first signal in a phase locked loop.

12. The method of claim 9, wherein the step of sampling the second signal from the sensing element includes sampling the second signal by an analog-to-digital converter.

13. The method of claim 9, wherein the step of sampling the second signal from the sensing element includes sampling the second signal at a multiple of the frequency of the first signal.

14. The method of claim 9, wherein the step of generating complex data in the frequency domain from the synchronized second signal in the time domain includes generating complex data through the use of a Fourier Transform.

15. The method of claim 9, wherein the angular rate determined from the complex data is a calculated angular rate, the method further comprising the step of determining a reported angular rate from the calculated angular rate based on a predetermined offset.

16. A system in an electronic sensor for extracting components of interest from signals, the system comprising:

a sensor element that reports a first signal and a second signal, the first signal having a frequency at an event;

a phase locked loop for receiving the first signal and determining the frequency of the event;

a signal sampler for receiving the second signal and generating a synchronized second signal in a time domain, the signal sampler capable of sampling the second signal based on the frequency of the event determined by the phase locked loop;

a spectrum analyzer for receiving the synchronized second signal in the time domain and generating complex data in a frequency domain; and a decoder for receiving the complex data in the frequency domain and generating a first component of interest, the first component of interest being a component of the complex data in the frequency domain.

17. The system of claim 16, the electronic sensor is a gyroscope, the sensor element having at least a pair of movable proof masses, the first signal and second signal being indicative of oscillatory movement of the proof masses, and the first component of interest being an angular rate of the sensing element.

18. The system of claim 17, wherein the decoder further generates a second component of interest, the second component of interest being a quadrature of the proof masses.

19. The system of claim 17, wherein the signal sampler is an analog-to-digital converter.

20. The system of claim 17, wherein signal sampler is further capable of sampling the second signal based on a multiple of the frequency of the event determined by the phase locked loop.

21. The system of claim 17, wherein the spectrum analyzer is capable of generating the complex data in the frequency domain using a Fourier Transform.

22. The system of claim 17, wherein the system further includes a scaling unit that is capable of generating a reported component of interest from the first component of interest based on a predetermined offset.

23. The system of claim 17, wherein the spectrum analyzer and the decoder are implemented in a digital signal processor.

* * * * *